Dec. 23, 1969    G. K. MERCER    3,485,267
VALVES FOR CONTROLLING THE FLOW OF FLUIDS
Filed Sept. 5, 1967    4 Sheets-Sheet 1
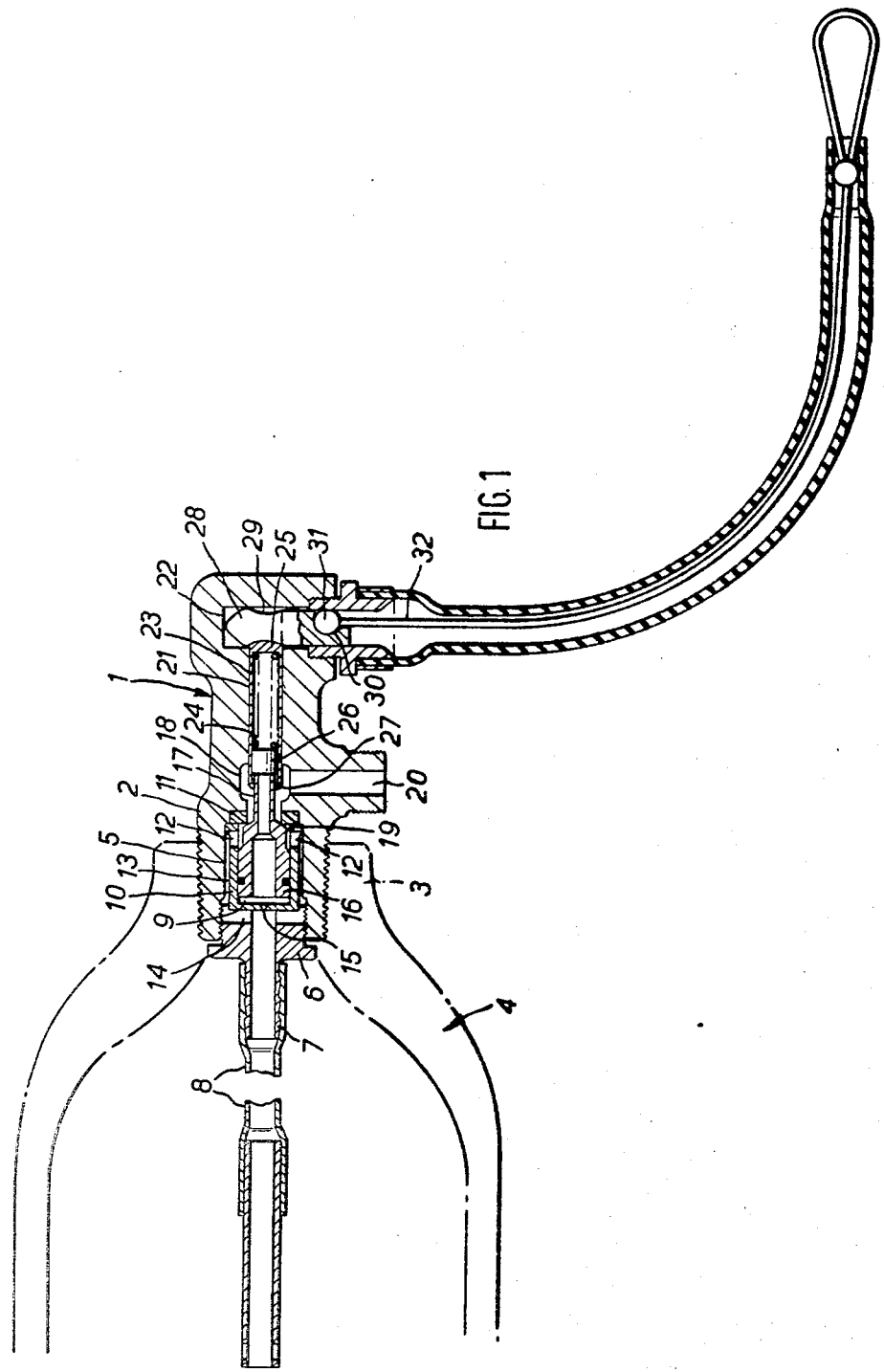

Dec. 23, 1969 G. K. MERCER 3,485,267
VALVES FOR CONTROLLING THE FLOW OF FLUIDS
Filed Sept. 5, 1967 4 Sheets-Sheet 2
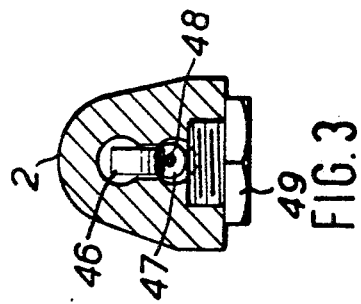
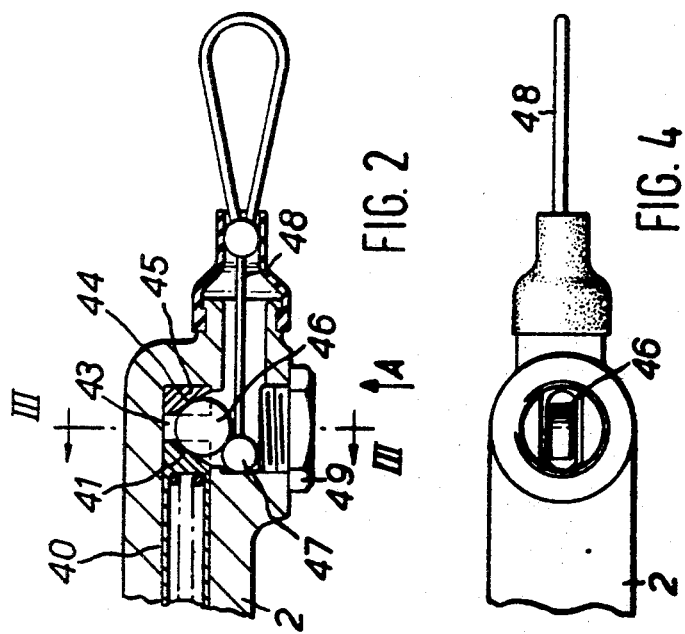
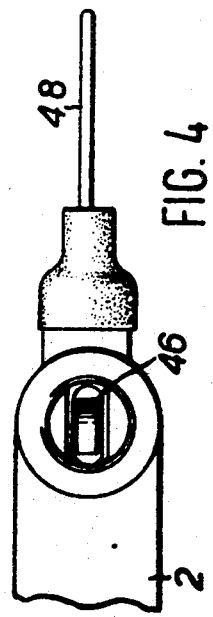

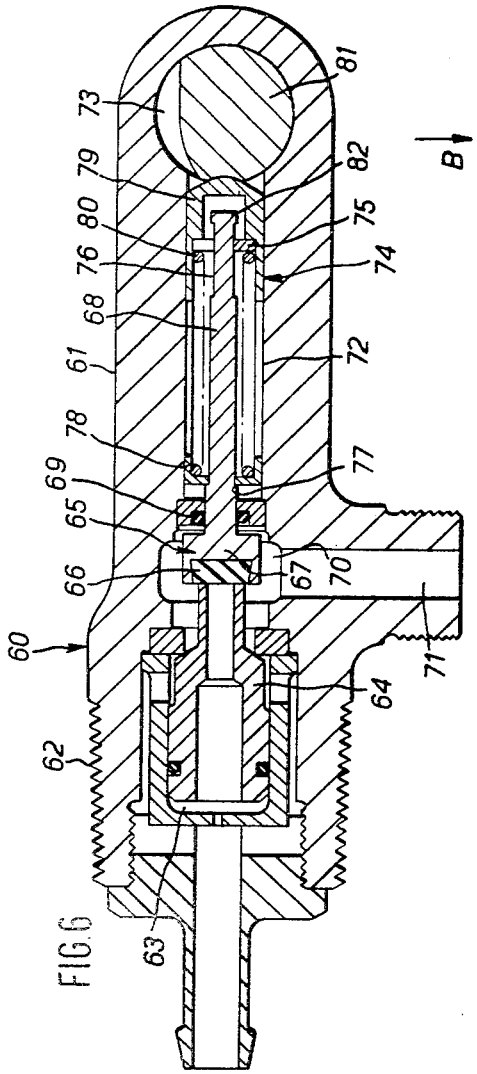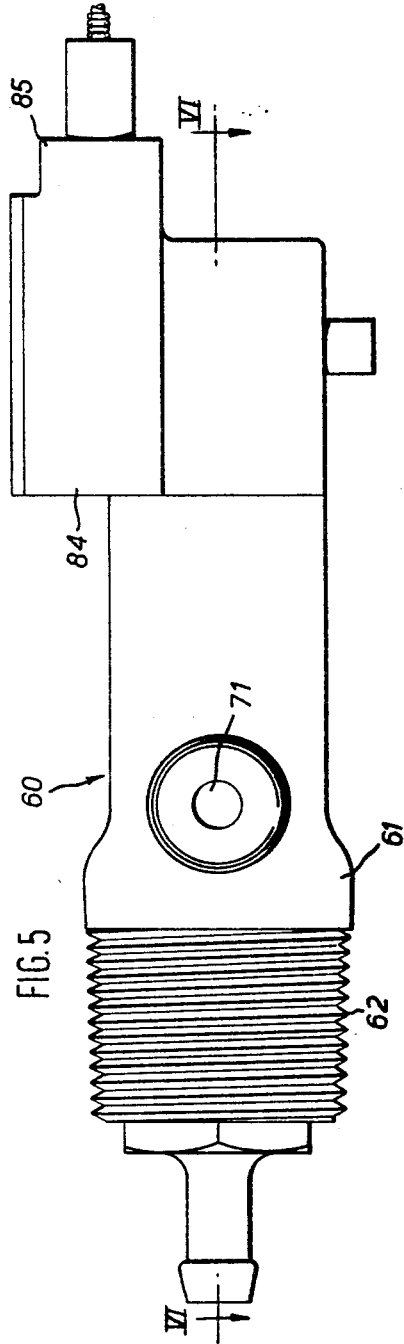

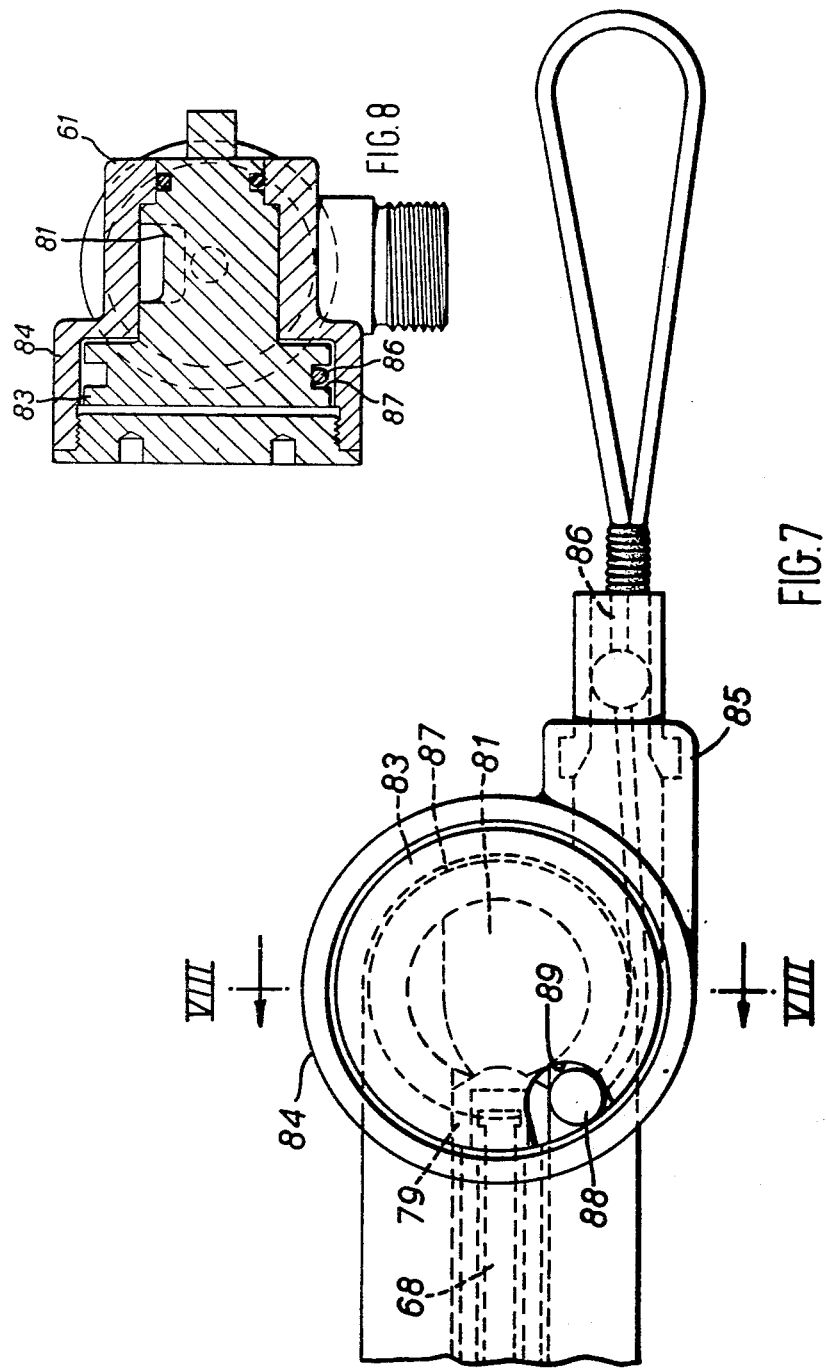

United States Patent Office 3,485,267
Patented Dec. 23, 1969

3,485,267
VALVES FOR CONTROLLING THE FLOW OF FLUIDS
George Kenneth Mercer, Bedworth, England, assignor to The Dunlop Company, Ltd., Fort Dunlop, Erdington, Birmingham, England, a corporation of Great Britain
Filed Sept. 5, 1967, Ser. No. 665,491
Claims priority, application Great Britain, Sept. 9, 1966, 40,367/66
Int. Cl. F16k 17/168, 31/46
U.S. Cl. 137—599.2                    12 Claims

ABSTRACT OF THE DISCLOSURE

A valve incorporating pressure relief means and intended particularly for attachment to a gas cylinder for use as a charging valve for inflatable articles. The valve comprises a valve plug held against its seat by a pressure differential under the control of a pilot valve in the form of a spring-loaded closure member arranged to seal a vent passage through the valve plug, releasable means being provided to hold the closure member in the closed position where it acts as a pressure-relief valve for the gas cylinder.

---

This invention relates to valves for controlling the flow of fluids and more particularly for charging inflatable liferafts and the like with carbon dioxide.

Carbon dioxide is usually stored, for these purposes, in pressurized cylinders, and since it is necessary for the cylinders to be carried on ships which may move from cold or temperate zones to tropical zones some means has to be provided to vent gas from the cylinders in the event of pressure increases which may occur as a result of increased ambient temperature. Hitherto relief of pressure increases beyond a predetermined safety limit has been obtained by the provision of frangible pressure-relief discs fitted to the cylinders. However, when these discs are broken by excess pressure the whole contents of the cylinder are lost and the associated liferaft is rendered inoperative until a new cylinder is provided.

One object of the present invention is to provide an improved flow control valve for a liferaft inflation cylinder having a safety valve forming part of the flow control valve and being capable of repeated venting operations without a total loss of the contents of the associated cylinder.

According to the invention a fluid flow control valve comprises a valve plug slidable in a valve chamber, the chamber having a restricted inlet opening through which fluid pressure can flow to act on a first area on one side of the valve plug and a relatively unrestricted duct by-passing the restricted opening to supply fluid pressure to a second smaller area on the opposite side of the valve plug, and an outlet opening having a valve seat with which the valve plug is engageable to close the outlet opening, the valve plug having a vent passage extending from the chamber to the outlet side of the valve seat, a closure member spring-loaded to a position in which it closes the vent passage and releasable means for holding the closure member in the closed position.

According to the invention also a charging valve for inflatable articles comprises a valve body having a valve chamber for connection to a fluid reservoir, the chamber having a restricted inlet opening through which fluid pressure from the reservoir can flow to act on a first area on one side of the valve plug and a relatively unrestricted duct by-passing the restricted opening to supply fluid pressure to a second smaller area on the opposite side of the valve plug, and an outlet opening having a valve seat with which the valve plug is engageable to close the outlet opening, the valve plug having a vent passage extending from the chamber to the outlet side of the valve seat, a closure member spring-loaded to a position in which it closes the vent passage and releasable means for holding the closure member in the closed position, the outlet opening being arranged to be connected to an associated inflatable article.

In the valve according to the invention excess pressure may displace the spring-loaded closure member from its seat to effect pressure relief, while inflation flow may be provided by releasing the closure member to allow first a flow of fluid from the valve chamber, followed by movement of the valve plug from its seat to give a full unrestricted flow.

Specific embodiments of the invention will now be described, by way of example, with reference to the accompanying drawings, in which:

FIGURE 1 is an axial cross-sectional view of a liferaft inflation cylinder incorporating a charging valve in accordance with the invention;

FIGURE 2 is a scrap cross-sectional view showing an alternative release mechanism for the valve shown in FIGURE 1;

FIGURE 3 is a cross-section on the line III—III of FIGURE 2;

FIGURE 4 is a view in the direction of the arrow A in FIGURE 2;

FIGURE 5 is a plan view of an alternative liferaft charging valve;

FIGURE 6 is a cross-section on the line VI—VI of FIGURE 5;

FGURE 7 is a scrap view in the direction of the arrow B in FIGURE 5;

FIGURE 8 is a cross-section on the line VIII—VIII of FIGURE 7.

In the embodiment of the invention shown in FIGURE 1 a valve 1 for use in charging liferafts and the like comprises a body 2 arranged to screw into the neck 3 of a carbon dioxide reservoir cylinder 4. The body 2 has a socket 5 formed at the end nearest the reservoir and is closed by a screw-in cap 6 having a spigot 7 for a siphon tube 8, the cap 6 being bored to allow flow therethrough. A valve chamber 9 is formed in a thimble 10 which is held in position in the socket 5 by the cap 6 and also serves to retain an annular nylon valve seat 11 at the end of the socket 5. The thimble 10 is formed with openings 12 adjacent the valve seat which communicate through a relatively unrestricted duct 13 provided by a clearance between the thimble and the socket wall and radial slots 14 formed in the end of the cap 6, with the siphon tube 8. The closed end of the thimble 10 forms an end wall of the valve chamber and has a fine jet bore 15 which forms a restricted inlet opening through which fluid can flow from the cylinder 4 to act on a first area on one side of a valve plug 16. The valve plug 16 has an integral stem 17 the plug and stem being bored axially therethrough to form a vent passage. The plug 16 is slidable within the thimble and the stem portion projects through the valve seat 11 and into a second chamber 18.

In the closed state of the valve fluid pressure from the reservoir is fed through the duct 13 to an annular area 19 of the plug adjacent the valve seat and acts in a direction tending to unseat the plug; the plug 16 is, however, normally held against the seat by the pressure within the thimble acting on the larger area of the plug on the side nearer the reservoir cylinder.

The second chamber 18 opens to a transverse delivery passage 20, for connection to a liferaft.

Coaxial with the first and second chambers, a passage 21 through the body extends from the second chamber 18 into a third chamber 22. A tubular capsule 23 is fluid-tightly slidably located in the passage 21 to seal the second chamber from the third chamber and houses a compression spring 24 which is compressed between a closed end 25 of the capsule 23 and a nylon piston 26 which is slidably located in the capsule and held captive therein by an inwardly turned lip 27. The stem 17 of the valve plug 16 projecting into the second chamber 18 enters the capsule 23 and contacts the piston, which constitutes a closure member which normally seals the vent passage through the plug, the capsule 23 being normally held in place by a locking member 28 and constituting a spring-loaded device in which the spring 24 holds the piston 26 in sealing engagement with the stem end, and differential fluid pressure holds the valve plug on the seat.

A high rate of flow for inflation of a liferaft is produced by releasing the locking member 28 to allow the capsule 23 to be displaced axially, thus releasing the pressure in the valve chamber 9. A pressure drop then occurs within the valve chamber 9, since the flow of fluid from the reservoir into the chamber is restricted by the jet 15, and the relatively unrestricted flow of fluid which is fed through the duct 13 to the annular area 19 of the valve plug adjacent the valve seat forces the plug from its seat to permit a rapid flow of fluid through the valve.

The locking member 28 is in the form of a waisted plunger 28 slidable in a transverse direction relative to the capsule in the third chamber 22 and the end 25 of the capsule is domed to fit the plunger waist 29. The member 28 has a notch 30 to receive a nipple 31 connected to a release cable 32 which can be pulled to displace the member 28 clear of the capsule and thus allow the capsule to move into the third chamber, causing the valve to open as described above.

The piston 26 also acts as a pressure relief valve. When the pressure in the cylinder 4 rises above a predetermined level the piston 26 is lifted from its seat to permit the excess pressure to escape, the piston 26 reseating when the pressure in the valve chamber 9 has returned to the predetermined level.

In another arrangement shown in FIGURES 2–4 the releasable means for holding the piston 26 in contact with the end of the valve stem 17 comprises a capsule 40 terminating in an inclined face 41 which extends into a third chamber 43 and a mirror image face 44 is provided on a thrust block 45 spaced from that face. The two faces 41 and 44 have a rounded body in the form of a roller 46 interposed, and held in interposition by a nipple 47 on the end of a release cable 48, the nipple 47 being trapped in a recess formed between the roller 46 and a part of the valve body constituted by a removable plug 49 (not shown in FIGURE 4). Release is effected by pulling the cable 48 to displace the nipple 47 past the roller 46. This causes an initial movement apart the inclined faces, following which, when the nipple 47 is removed, the spring pressure from the capsule 40 acting on the roller 46 can displace the roller 46 to allow the two inclined faces 41 and 44 to be moved into engagement, thus allowing the capsule to move axially and to reduce the pressure which it exerts on the associated closure member.

An alternative charging valve 60 is shown in FIGURES 5–8. The valve 60 comprises a valve body 61 having a screw-threaded portion 62 for screwing into the neck of a liferaft inflation cylinder, and contains a valve chamber 63 and valve plug 64 similar to the corresponding components of the valve 1 shown in FIGURE 1 and described above.

The closure member 65 of the valve 60 comprises a rubber valve disc 66 carried on the head 67 of a spindle 68. The spindle 68 passes through an O-ring seal 69 which isolates a second chamber 70 of the valve, having an outlet 71 for connection to a liferaft, from a passage 72 leading to a third chamber 73, and is retained at one end within a capsule 74 by a slotted washer 75, the spindle having an axially-extending annular groove 76 adjacent that end for engagement by the washer. The head 67 of the spindle 68 has a shoulder 77, and the capsule 74 comprises a pair of separate cup-shaped parts 78 and 79 urged axially apart by a spring 80, the part 78 engaging the shoulder 77 to urge the head 67 into sealing engagement with the stem of the valve plug 64.

A looking member for the capsule 74 takes the form of a cam 81 rotatably mounted in the third chamber 73 and rotatable from a position in which it holds the head 67 of the spindle 68 against the stem of the valve plug to a position in which it permits the adjacent cup-shaped part 79 to move into the third chamber 73. When this movement occurs, the slotted washer 75 is moved axially along its annular groove in the spindle until it engages an abutment 82 at the end of the spindle, and the spring thrust is then taken by the respective reactions at the shoulder 77 at one end of the spindle and at the abutment 82 at the other end, thus releasing the thrust acting to hold the head 67 against the stem of the valve plug.

Rotation of the cam is effected by a pulley wheel 83 formed coaxially and integrally with the cam 81 and closely surrounded by a cylindrical housing 84 forming part of the valve body 61. The housing has a tubular extension 85 extending tangentially to the pulley wheel 83 and through which a release cord 86 passes to engage a groove in the outer surface of the pulley. In the closed state of the valve the cord is wrapped around a 90° sector of the pulley and a cylindrical nipple 88 at its end is secured in a recess 89 cut into the pulley. The arrangement is such that when the cord is pulled it rotates the pulley and the cam through 90° to release the valve, and the nipple 88 is then freed from its recess to allow the cord to be withdrawn through the tubular extension.

The liferaft charging valves described above each have the advantage that whenever, as a result of an increase in ambient temperature, the pressure in the associated carbon dioxide reservoir cylinder rises above a predetermined safety limit the valve will permit a small amount of gas to escape through the vent passage into the liferaft, thus reducing the pressure in the cylinder to a safe level without losing the major portion of the gas contained in the cylinder. Further, the valves described above have the advantage of providing rapid inflation following movement of the main valve plug as a result of the operation of the small pilot valve constituted by the vent passage and closure member, and it will be noted that the two functions of pressure relief and charging of the liferaft are carried out by a single valve, providing a combination which is economical to manufacture and convenient to instal and maintain.

Having now described my invention, what I claim is:

1. A fluid flow control valve comprising a valve chamber, a valve plug slidable in said valve chamber, said chamber having a restricted inlet opening through which fluid pressure can flow to act on a first area on one side of said valve plug and a relatively unrestricted duct bypassing the restricted opening to supply fluid pressure to a second smaller area on the opposite side of said valve plug, means forming an outlet opening having a valve seat with which the valve plug is engageable to close said outlet opening, the valve plug having a vent passage extending from the valve chamber to the outlet side of said valve seat, a closure member responsive to the pressure in said valve chamber through said restricted opening to relieve the pressure in said valve chamber and springloaded to a position in which it closes the vent passage, and releasable means for holding the closure member in the closed position and operable to effect opening of said closure member independently of the venting operation through said restricted opening.

2. In combination with a fluid reservoir, a charging valve for inflatable articles comprising a valve body having a valve chamber for connection to said fluid reservoir, said chamber having a restricted inlet opening through which fluid pressure from said reservoir can flow, a valve plug having a first area on one side thereof responsive to pressure in said reservoir and a relatively unrestricted duct by-passing the restricted opening to supply fluid pressure to a second smaller area on the opposite side of said valve plug, an outlet opening having a valve seat with which said valve plug is engageable to close said outlet opening, said valve plug having a vent passage extending from said chamber to the outlet side of the valve seat, a closure member spring-loaded to a position in which it closes the vent passage, and is responsive to pressure in said chamber through said restricted inlet opening and releasable means for holding the closure member in a closed position, said outlet opening being arranged to be connected to an associated inflatable article, said closure member being operative to effect opening of said vent passage independently of said releasable means.

3. A charging valve according to claim 2 wherein the valve plug is slidable in a valve chamber formed in a thimble mounted in a socket formed in the valve body, the closed end of the thimble forming an end wall of the chamber and having a restricted opening to allow fluid pressure to flow to one side of the plug, the relatively unrestricted duct being formed by a clearance around the thimble leading to an opening in the wall of the thimble adjacent the valve seat through which fluid pressure can flow to an annular area of the opposite side of the plug adjacent the valve seat.

4. A charging valve according to claim 2 wherein the valve plug has a portion projecting through the valve seat into a second chamber formed in the valve body on the outlet side of the valve seat and arranged to be connected to an associated inflatable article, the vent passage extending from the valve chamber through the projecting portion of the plug into the second chamber and being normally closed by the said closure member.

5. A charging valve according to claim 4 wherein the releasable means for holding the closure member in the closed position comprises a spring-loaded device mounted in the valve body so as to apply pressure to the closure member and including a locking member which can be moved by external means to effect release of the closure member, the locking member being mounted in a third chamber of the body and sealing means being provided to seal the third chamber from the second chamber.

6. A charging valve according to claim 5 wherein the spring-loaded device comprises a capsule having a piston slidable therein at one end of the capsule to engage the projecting portion of the valve plug and seal the vent passage therein, the capsule containing a spring to urge the piston towards the valve plug and to urge the capsule in the opposite direction, the locking member being arranged in the locked position thereof to prevent displacement of the capsule away from the valve plug.

7. A charging valve according to claim 6 wherein the locking member is in the form of a waisted plunger slidable in a transverse direction relative to the capsule, the capsule being arranged to engage the plunger waist in the closed position of the valve.

8. A charging valve according to claim 6 wherein the locking member is in the form of a rounded body interposed between an inclined face formed on the associated end of the capsule and a second inclined face formed on a thrust block spaced from the capsule, a cable nipple being arranged to be trapped in a recess formed between the rounded body and a part of the valve body to hold the rounded body in the interposed position, the arrangement being such that displacement of the cable nipple past the rounded body will effect initially a displacement of the rounded body causing a movement apart of the inclined faces and then further displacement of the rounded body which allows the capsule to move and to reduce the pressure which it exerts on the associated closure member.

9. A charging valve according to claim 5 wherein the closure member is carried on a spindle passing slidably through a seal positioned between the second chamber and the third chamber.

10. A charging valve according to claim 9 wherein the spring-loaded device comprises a capsule formed from a pair of separate cup-shaped parts urged axially apart by a spring, one part being engageable by one end of the spring to urge the closure member towards the closed position and the other part being engageable with the locking member, the other end of the spring being engageable in the closed state of the valve with the said other part of the capsule and an abutment being provided on the spindle to prevent expansion of the spring beyond a predetermined amount.

11. A charging valve according to claim 5 wherein the locking member is in the form of a cam rotatably mounted in the third chamber of the valve body.

12. A charging valve according to claim 11 wherein a pulley is provided to rotate the cam, the pulley being rotatable by a cable wrapped around a sector of the pulley and having a nipple secured in a recess in the pulley and held captive in the recess in the pulley by a cylindrical housing closely surrounding the pulley, the arrangement being such that the cable can be pulled to rotate the pulley and the cam through a predetermined angle after which the nipple is released from the recess.

References Cited

UNITED STATES PATENTS

| 932,262 | 8/1909 | Ford | 137—490 |
|---|---|---|---|
| 1,217,792 | 2/1917 | McConnell | 251—38 |
| 3,036,587 | 5/1962 | Silver | 137—222 X |
| 3,204,926 | 9/1965 | Wismar | 251—44 X |

FOREIGN PATENTS 1,251,906  12/1960  France.

ARNOLD ROSENTHAL, Primary Examiner

U.S. Cl. X.R.

137—489; 251—38, 257